United States Patent
Xu et al.

(10) Patent No.: US 12,541,138 B2
(45) Date of Patent: Feb. 3, 2026

(54) CAMERA MODULES WITH MECHANICAL IRIS ASSEMBLIES

(71) Applicant: Apple Inc., Cupertino, CA (US)

(72) Inventors: Bin Xu, Sunnyvale, CA (US); Wei Li, Sunnyvale, CA (US); Zhuzhen Ji, Milpitas, CA (US); Xiao Liao, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 99 days.

(21) Appl. No.: 18/373,806

(22) Filed: Sep. 27, 2023

(65) Prior Publication Data

US 2025/0102883 A1    Mar. 27, 2025

(51) Int. Cl.
*G03B 9/22* (2021.01)

(52) U.S. Cl.
CPC ..................................... *G03B 9/22* (2013.01)

(58) Field of Classification Search
CPC ... G03B 9/02; G03B 9/06; G03B 9/08; G03B 7/003; G02B 5/005
See application file for complete search history.

(56) References Cited

U.S. PATENT DOCUMENTS

| | | |
|---|---|---|
| 5,446,514 A | 8/1995 | Matsumoto |
| 7,511,391 B2 | 3/2009 | Kawamoto et al. |
| 8,137,011 B2 | 3/2012 | Suzuki et al. |
| 2006/0244859 A1 | 11/2006 | Ji et al. |
| 2022/0413361 A1* | 12/2022 | Fu .......................... G01B 7/003 |
| 2024/0419054 A1* | 12/2024 | Kwon ...................... G03B 9/06 |

FOREIGN PATENT DOCUMENTS

CN      115755491      3/2023

OTHER PUBLICATIONS

U.S. Appl. No. 18/666,515, filed May 16, 2024, Xu et al.

* cited by examiner

*Primary Examiner* — Noam Reisner
(74) *Attorney, Agent, or Firm* — Brownstein Hyatt Farber Schreck, LLP

(57) ABSTRACT

Various embodiments disclosed herein include mechanical iris assemblies, as well as camera modules and devices that incorporate these mechanical iris assemblies. The mechanical iris assemblies described herein include a stator piece, a rotor piece, a set of blade elements, and an actuator arrangement. The actuator arrangement may include a voice coil actuator having at least one magnet carried by the stator piece and at least one coil carried by the rotor piece. The mechanical iris assembly includes a set of springs configured to carry current between the stator piece and the rotor piece to power the coil or coils carried by the rotor piece.

16 Claims, 9 Drawing Sheets

CAMERA MODULES WITH MECHANICAL IRIS ASSEMBLIES

FIELD

This disclosure relates to camera modules that include mechanical iris assemblies, and more specifically mechanical iris assemblies that utilize springs to carry current between a stator piece and a rotor piece.

BACKGROUND

Cameras continue to be an important feature of consumer electronics devices such as smartphones, tablets, and computers. While larger cameras, such as single-lens reflex cameras ("SLR cameras"), typically utilize a mechanical iris to controllably adjust the aperture stop of the camera, many cameras in consumer electronics devices do not have adjustable apertures. Space is at a premium in consumer electronics devices, and it may be difficult to incorporate mechanical iris assemblies within the size and space constraints of such a device. Accordingly, it may be desirable to provide camera modules with compact mechanical iris assemblies.

SUMMARY

The present disclosure relates to mechanical iris assemblies, as well as cameras and devices incorporating these mechanical iris assemblies. In some variations, a camera may include an optical assembly that includes a lens module and a mechanical iris assembly. The mechanical iris assembly includes a set of blade elements, a stator piece, a rotor piece, and a set of springs connecting the rotor piece to the stator piece. The mechanical iris assembly further includes an actuator arrangement with a magnet that is fixed relative to the stator piece and a coil that is fixed relative to the rotor piece, such that the coil is positioned in a magnetic field of the magnet and is electrically connected to the set of springs. A controller may be configured to drive current through the coil via the set of springs to rotate the rotor piece relative to the stator piece. The mechanical iris assembly may be configured such that rotation of the rotor piece relative to the stator piece rotates the set of blade elements relative to the stator piece.

In some of these variations, the mechanical iris assembly includes a flex circuit electrically connected to the set of springs. In some of these variations, one or more of the set of springs is mounted directly to the flex circuit. Additionally or alternatively, the rotor piece may define a first post, the stator piece may define a second post, and a blade element of the set of blade elements is moveably connected to the first post and the second post. In some of these variations, a spring of the set of springs is electrically connected to the first post and the second post. In some variations, the set of spring includes a first spring and a second spring, and the controller is configured to drive the current through the coil via the set of springs such that the current flows to the coil via the first spring and flows from the coil via the second spring. In some variations, the mechanical iris assembly comprises a set of ball bearings positioned between the rotor piece and the stator piece.

Other embodiments are directed to a camera having an optical assembly with a lens module and a mechanical iris assembly. In these embodiments, the mechanical iris assembly includes a set of blade elements, a rotor piece, a stator piece, a set of springs connecting the rotor piece and the stator piece, and a set of voice coil actuators configured to rotate the rotor piece relative to the stator piece. Each voice coil actuator may include at least one magnet connected to the stator piece and at least one coil connected to the rotor piece. The mechanical iris assembly may be configured to route current between the rotor piece and the stator piece via the set of springs to power the set of voice coil actuators, and may be configured such that rotation of the rotor piece relative to the stator piece rotates the set of blade elements relative to the stator piece.

In some variations, the at least one magnet of each of the set of voice coil actuators comprises a first magnet and a second magnet having opposite polarities. Additionally or alternatively, at least one coil of each of the set of voice coil actuators may be mounted to a corresponding substrate. In some variations, the mechanical iris assembly comprises a flex circuit electrically connected to the set of springs. In some of these variations, at least one spring of the set of springs is mounted directly to the flex circuit. In some variations, the rotor piece defines a first set of posts, the stator piece defines a second set of posts, and a blade element of the set of blade elements is moveably connected to a first post of the first set of posts and a second post of the second set of posts. In some of these variations, a spring of the set of springs is electrically connected to the first post and the second post.

Still other embodiments are directed to a mechanical iris assembly that includes a set of blade elements, a rotor piece, a stator piece, and a set of springs connecting the rotor piece to the stator piece. The mechanical iris assembly includes an actuator arrangement configured to rotate the rotor piece relative to the stator piece and including at least one magnet that is fixed relative to the stator piece, and at least one coil that is fixed relative to the rotor piece and positioned in a magnetic field of the at least one magnet. The mechanical iris assembly is configured to route current between the rotor piece and the stator piece via the set of springs to power the actuator arrangement, and is configured such that rotation of the rotor piece relative to the stator piece rotates the set of blade elements relative to the stator piece.

In some of these variations, the mechanical iris assembly includes a flex circuit electrically connected to the set of springs. In some of these variations, at least one spring of the set of springs is mounted directly to the flex circuit. Additionally or alternatively, the rotor piece may define a first set of posts, the stator piece may define a second set of posts, and a blade element of the set of blade elements may be moveably connected to a first post of the first set of posts and a second post of the second set of posts. In some of these variations, a spring of the set of springs is electrically connected to the first post and the second post. In some variations, a set of ball bearings may be positioned between the rotor piece and the stator piece.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
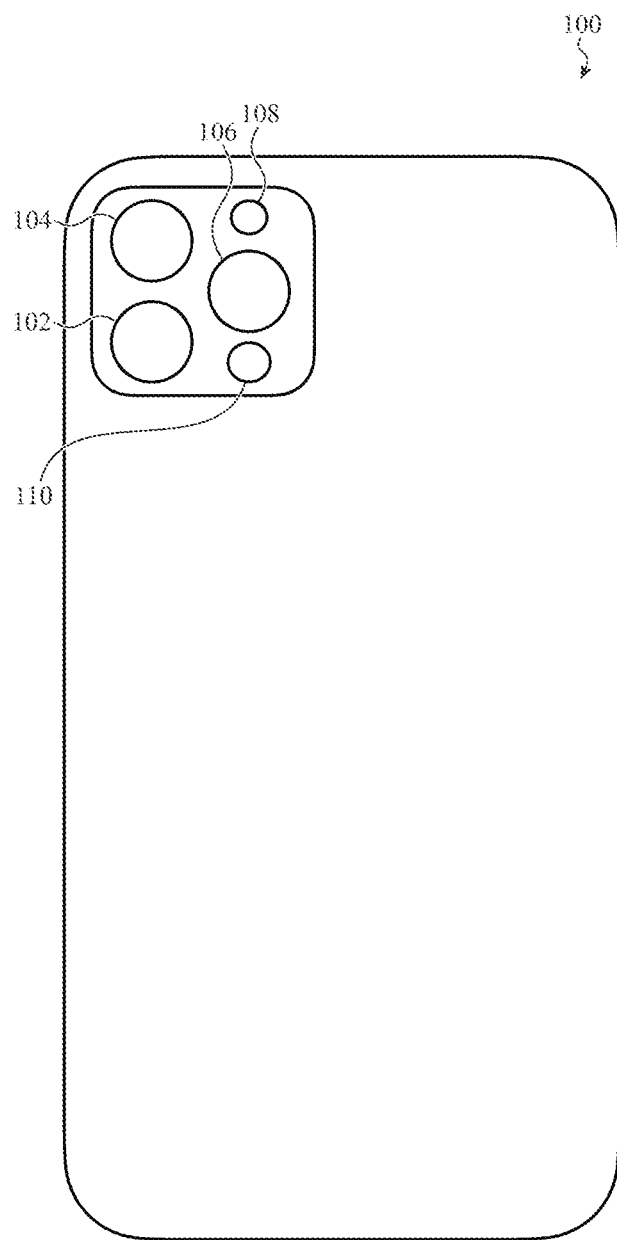
FIG. 1A illustrates a device as described herein having a camera with a mechanical iris assembly.

It should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

Directional terminology, such as "top," "bottom," "upper", "lower", "front", "back", "over", "under", "above", "below", "left", "right", "vertical", "horizontal", etc. is used with reference to the orientation of some of the components in some of the figures described below, and is not intended to be limiting. Because components in various embodiments can be positioned in a number of different orientations, directional terminology is used for purposes of illustration to demonstrate the relative orientation between components of the systems and devices described herein. The directional terminology is intended to be construed broadly, and therefore should not be interpreted to preclude components being oriented in different ways. Also, as used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Various embodiments disclosed herein include mechanical iris assemblies, as well as camera modules and devices that incorporate these mechanical iris assemblies. The mechanical iris assemblies described herein include a stator piece, a rotor piece, a set of blade elements, and an actuator arrangement. The actuator arrangement is configured to rotate the rotor piece relative to the stator piece, and the mechanical iris assembly is configured such that rotation of the rotor piece also rotates the set of blade elements relative to the stator piece. Accordingly, the mechanical iris assembly may controllably move the set of blade elements to adjust the size and/or shape of an input aperture of a camera module.

In some variations, a mechanical iris assembly has an actuator arrangement that includes at least one voice coil actuator and a set of springs connecting the rotor piece to the stator piece. Each voice coil actuator includes at least one magnet connected to the stator piece and at least one coil connected to the rotor piece. The at least one coil may be positioned in a magnetic field generated by the at least one magnet, and a controller may be configured to drive current through the at least one coil. The set of springs is configured to carry current between the stator piece and the rotor piece to power the at least one coil.

These and other embodiments are discussed below with reference to FIGS. 1A-4B. However, those skilled in the art will readily appreciate that the detailed description given herein with respect to these figures is for explanatory purposes only and should not be construed as limiting.

The mechanical iris assemblies described herein may be incorporated into a camera module, which in turn may be incorporated into an electronic device such as a phone, tablet, computer, or the like. FIG. 1A depicts an example device 100 as described herein. As shown there, the device 100 includes a first camera 102 having a mechanical iris assembly. The mechanical iris assembly allows for controllably adjusting the size of an input aperture of the first camera 102, thereby providing the first camera 102 with multiple aperture stops.

In some instances, the first camera 102 is part of a multi-camera system. For example, in the variation shown in FIG. 1A, the first camera 102 is part of a multi-camera system having a second camera 104, and a third camera 106. The second camera 104 and/or third camera 106 may also include mechanical iris assemblies as described herein, but need not. It should be appreciated that the device 100 may include a single camera, or a multi-camera system having any number of cameras (with any relative positioning) as may be desired. Additionally, while shown as placed on the rear of a device 100, it should be appreciated that a camera having a mechanical iris assembly may be additionally or alternatively placed on the front (e.g., a front side having a display) or any other side of the device as desired.

In some instances, the device 100 may include a flash module 108. The flash module 108 may provide illumination to some or all of the fields of view of the cameras of the device 100 (e.g., the fields of view of the first camera 102, the second camera 104, and/or the third camera 106). This may assist with image capture operations in low light settings. Additionally or alternatively, the device 100 may further include a depth sensor 110 that may calculate depth information for a portion of the environment around the device 100. Specifically, the depth sensor 110 may calculate depth information within a field of coverage (i.e., the widest lateral extent to which the depth sensor is capable of providing depth information). The field of coverage of the depth sensor 110 may at least partially overlap the field of view of one or more of the cameras (e.g., the fields of view of the first camera 102, second camera 104, and/or third camera 106). The depth sensor 110 may be any suitable system that is capable of calculating the distance between the depth sensor 110 and various points in the environment around the device 100.

The depth information may be calculated in any suitable manner. In one non-limiting example, a depth sensor may utilize stereo imaging, in which two images are taken from different positions, and the distance (disparity) between corresponding pixels in the two images may be used to calculate depth information. In another example, a depth sensor may utilize structured light imaging, whereby the depth sensor may image a scene while projecting a known pattern (typically using infrared illumination) toward the scene, and then may look at how the pattern is distorted by the scene to calculate depth information. In still another example, a depth sensor may utilize time of flight sensing, which calculates depth based on the amount of time it takes for light (typically infrared) emitted from the depth sensor to return from the scene. A time-of-flight depth sensor may utilize direct time of flight or indirect time of flight, and may illuminate an entire field of coverage at one time, or may only illuminate a subset of the field of coverage at a given time (e.g., via one or more spots, stripes, or other patterns that may either be fixed or may be scanned across the field of coverage). In instances where a depth sensor utilizes infrared illumination, this infrared illumination may be utilized in a range of ambient conditions without being perceived by a user.

In some embodiments, the device 100 is a portable multifunction electronic device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer, which may have a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content by transmitting, via a wired or wireless connection, data (e.g., image data or video data) to an integrated or external display generation component to visually produce the content.

Figure 1B:
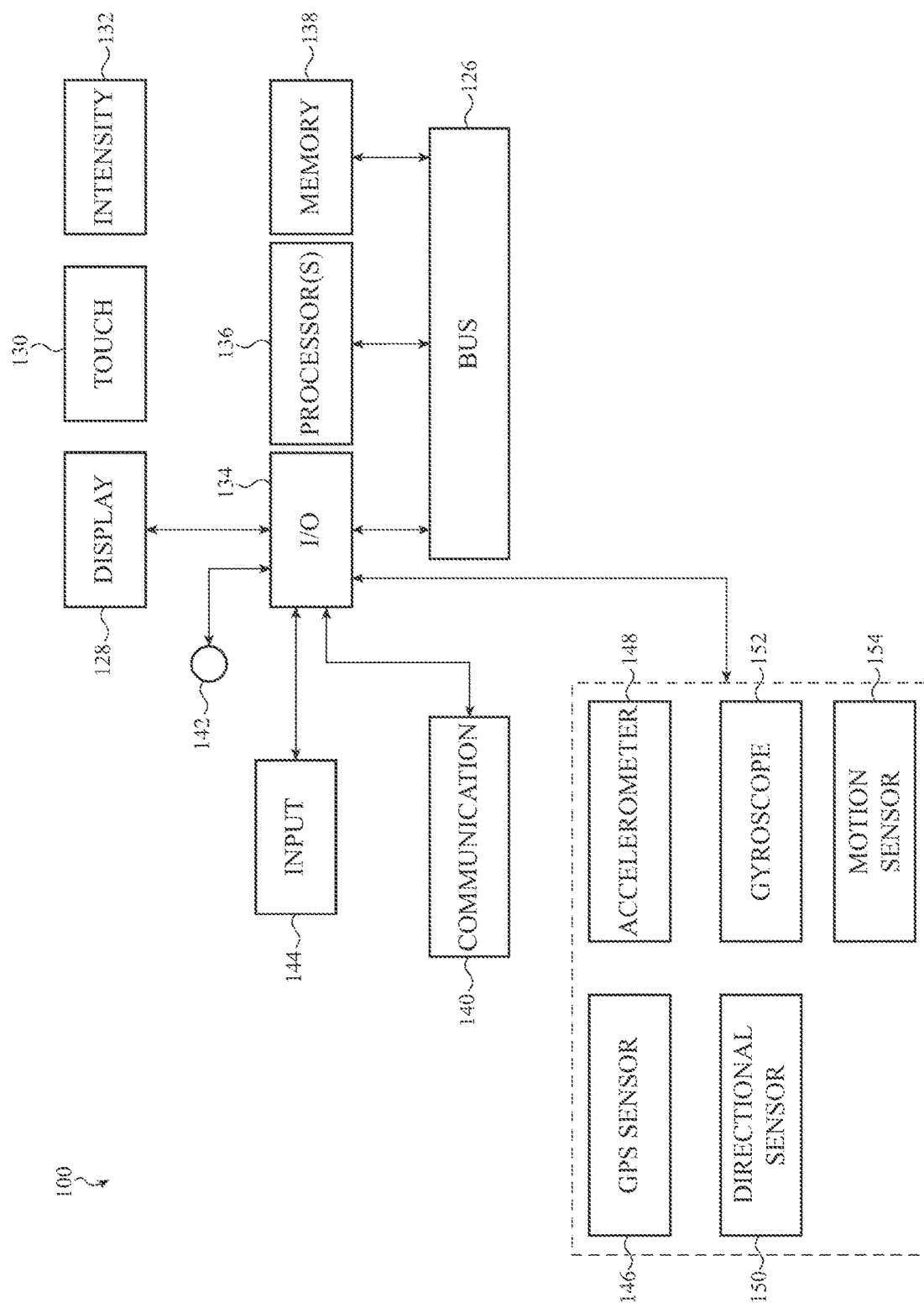
FIG. 1B depicts exemplary components of the device of FIG. 1A.

FIG. 1B depicts exemplary components of the device 100. In some embodiments, device 100 has a bus 126 that operatively couples an I/O section 134 with one or more computer processors 136 and memory 138. The I/O section 134 can be connected to display 128, which can have touch-sensitive component 130 and, optionally, intensity sensor 132 (e.g., contact intensity sensor). In addition, I/O section 134 can be connected with communication unit 140 for receiving application and operating system data, using Wi-Fi, Bluetooth, near field communication (NFC), cellular, and/or other wireless communication techniques. The device 100 can include input mechanisms 142 and/or 144. Input mechanism 142 is, optionally, a rotatable input device or a depressible and rotatable input device, for example. Input mechanism 142 is, optionally, a button, in some examples. The device 100 optionally includes various sensors, such as GPS sensor 146, accelerometer 148, directional sensor 150 (e.g., compass), gyroscope 152, motion sensor 154, and/or a combination thereof, all of which can be operatively connected to I/O section 134. Some of these sensors, such as accelerometer 148 and gyroscope 152 may assist in determining an orientation of the device 100 or a portion thereof.

Memory 138 of the device 100 can include one or more non-transitory computer-readable storage mediums, for storing computer-executable instructions, which, when executed by one or more computer processors 136, for example, can cause the computer processors to perform the techniques that are described here (such as actuating the mechanical iris assemblies described herein). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

The processor 136 can include, for example, dedicated hardware as defined herein, a computing device as defined herein, a processor, a microprocessor, a programmable logic array (PLA), a programmable array logic (PAL), a generic array logic (GAL), a complex programmable logic device (CPLD), an application-specific integrated circuit (ASIC), a field-programmable gate array (FPGA), or any other programmable logic device (PLD) configurable to execute an operating system and applications of device 100, as well as to facilitate capturing of images as described herein. Device 100 is not limited to the components and configuration of FIG. 1B, but can include other or additional components in multiple configurations.

Figure 1C:
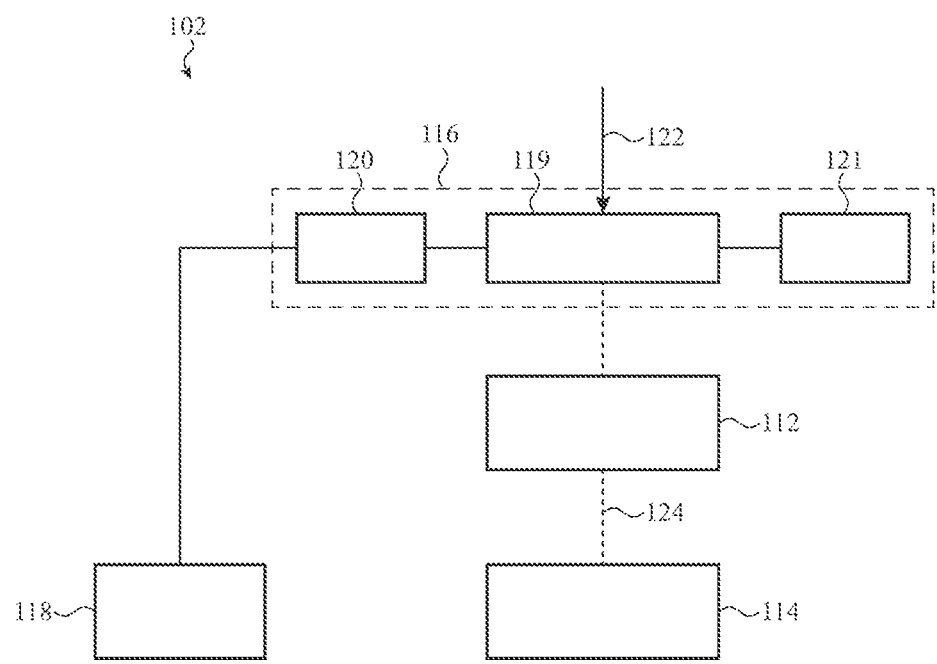
FIG. 1C illustrates components of the camera with the mechanical iris assembly of FIG. 1A.

FIG. 1C illustrates components of the first camera 102 of the device 100 of FIG. 1A. The first camera 102 includes a lens module 112, an image sensor 114, a mechanical iris assembly 116, and a controller 118. The lens module 112, the image sensor 114, and the mechanical iris assembly 116 collectively form an optical assembly of the camera, which collects and measures light 122 entering the camera 102 to capture images.

Specifically, the mechanical iris assembly 116 is positioned to receive light 122 entering the camera 102 from the environment (e.g., emitted and/or reflected from the scene surrounding the camera 102), The mechanical iris assembly 116 defines an input aperture through which light may pass through the mechanical iris assembly 116, and includes a set of blade elements 119 that are moveable to change the size of the input aperture. Each blade element 119 is formed from or coated with an opaque material that blocks light at one or more wavelengths measured by the camera 102, and is shaped such that a portion of each blade element is capable of blocking light from entering the camera 102.

Movement of the blade elements 119 may change the size of the input aperture between a minimum size and a maximum size. In some instances the mechanical iris assembly 116 is capable of being placed in a closed configuration in which blade elements 119 block any light 122 from passing through the mechanical iris assembly 116 (e.g., the input aperture is "closed" and thus has zero area). In other instances, the minimum size of the input aperture may be a non-zero size, such that the input aperture is "open" and the set of blade elements 119 allow at least some light to pass through the mechanical iris assembly 116. In these instances, the input aperture may remain open during operation of the camera 102, and the mechanical iris assembly 116 may be configured to always pass light 122 through the input aperture. Overall, the size of the input aperture may be selectively changed to control how much light passes through the mechanical iris assembly 116 to other components of the optical assembly (e.g., the lens module 112 and the image sensor 114). It should be appreciated that, in some variations, the mechanical iris assembly 116 is configured such that movement of the blade elements 119 may additionally or alternatively change the shape of the input aperture.

Accordingly, the mechanical iris assembly 116 further includes an actuator arrangement 120 that is configured to control the relative positioning of the set of blade elements 119. The actuator arrangements 120 described herein include one or more voice coil actuators, each of which includes a corresponding set of magnets and set of coils. Each voice coil actuator is configured to generate a Lorentz force between two components as current is driven through the set of coils, such as described in more detail herein. The actuator arrangement 120 may be controlled by the controller 118 to set the relative positioning of the set of blade elements 119, and thereby control the size and/or shape of the input aperture. Specifically, the controller 118 may include a driver that is configured to operate the actuator arrangement. For example, in instances where the actuator arrangement 120 includes a voice coil actuator, the controller 118 may include a voice coil driver that is configured to drive current through one or more coils of the voice coil actuator. During operation of the camera 102, the controller 118 may receive (e.g., from other components within the camera 102 or the electronic device 100) or otherwise determine (e.g., using a processor as described herein) a target relative positioning of the set of blade element 119, and may control the actuator arrangement 120 to move the set of blade elements 119 to achieve the target relative positioning.

In some variations, the mechanical iris assembly 116 may include one or more position sensors 121 (e.g., a Hall effect sensor or the like) that are configured to determine the relative position of one or more components of the mechanical iris assembly 116. Information from the position sensor(s) 121 may help in controlling the positioning of the set of blade elements 119. For example, the controller 118 may receive information from the one or more position sensors 121, and may utilize this information as feedback in controlling the actuator arrangement 120.

The lens module 112 is positioned to receive light 122 that passes through the input aperture of the mechanical iris assembly 116, and to direct the light 122 along an optical axis 124 of the optical assembly to the image sensor 114. As used herein, the optical axis of an optical assembly is considered to extend through the input aperture of the mechanical iris assembly, through the lens assembly, and to the image sensor. The portion of the optical axis that extends through the mechanical iris assembly will also be referred to herein as the "optical axis of the mechanical iris assembly." Similarly, the portion of the optical axis that extends through the lens assembly will also be referred to herein as the "optical axis of the lens assembly." The image sensor 114 may be operated to capture images using light received along the optical axis 124. The lens module 112 includes one or more lens groups (e.g., a single lens group or multiple lens groups), each of which includes one or more lens elements (e.g., made from glass, plastic, or the like) that are configured to receive and refract light along the optical axis 124.

In some variations, the camera 102 may include one or more additional actuators (e.g., a bearing actuator, a stepped motor, a voice coil motor actuator, a piezoelectric actuator, a leaf spring actuator, combinations thereof, and the like) that are configured to move other components of the optical assembly within the camera 102. For example, one or more of these additional actuators may move the image sensor 114 in one or more directions relative to the lens module 112. Additionally or alternatively, one or more of these additional actuators may move the lens module 112 (and, in some of these variation, the mechanical iris assembly 116) in one or more directions relative to the image sensor 114. Depending on the direction of movement, relative movement between the lens module 112 and the image sensor 114 may provide autofocus and/or optical image stabilization capabilities to the camera 102. When the lens module 112 includes multiple lens groups, some of the lens groups may be moveable relative to other lens groups using one of these additional actuators. This may allow for selective adjustment of the focal length of the lens module 112.

Figure 2:
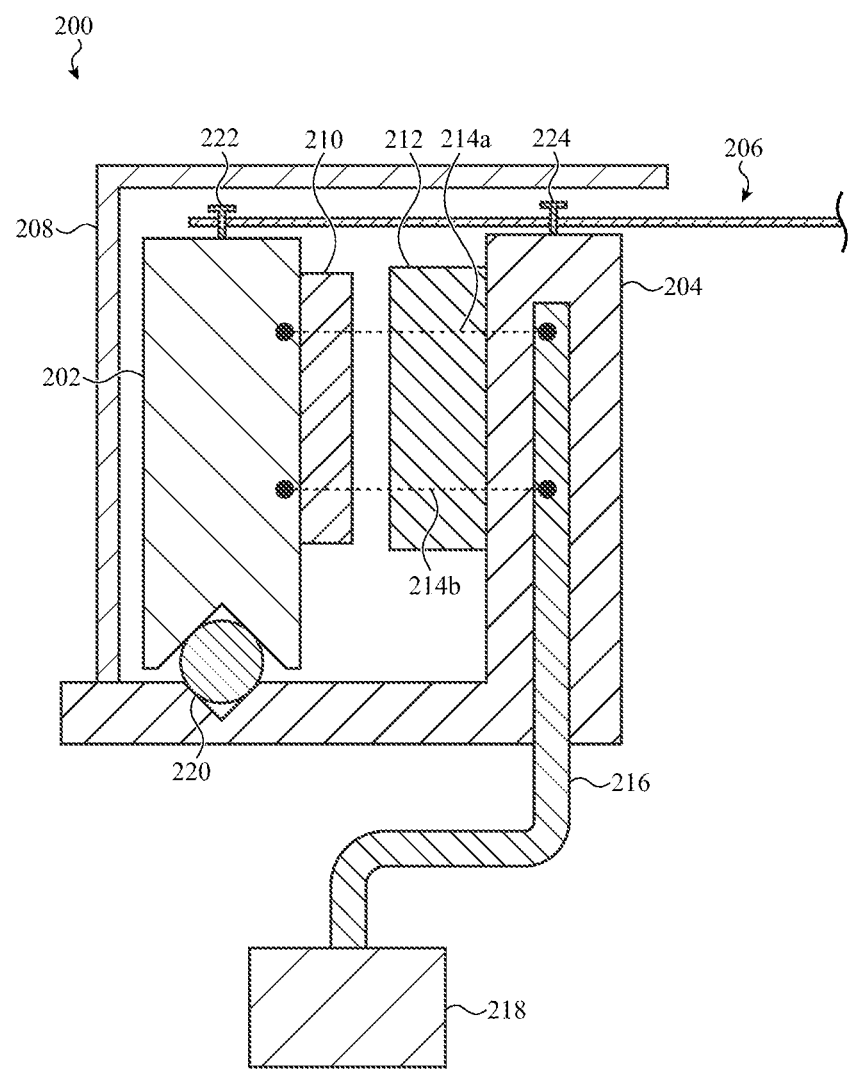
FIG. 2 shows a cross-sectional side view of a portion of a mechanical iris assembly as described herein.

FIG. 2 shows a cross-sectional side view of a portion of a mechanical iris assembly 200 that may be used with the optical assemblies described herein. As shown, the mechanical iris assembly 200 includes a rotor piece 202, a stator piece 204, and a set of blade elements including a first blade element 206. The mechanical iris assembly 200 may further include a housing piece 208, which may act to at least partially enclose the components of the mechanical iris assembly 200. Additionally, the mechanical iris assembly 200 includes an actuator arrangement that is configured to rotate the rotor piece 202 relative to the stator piece 204.

For example, in the variation shown in FIG. 2, the actuator arrangement includes a voice coil actuator having a magnet 212 and a coil 210. The magnet 212 of the voice coil actuator is fixed relative to the stator piece 204. The coil 210 of the voice coil actuator is fixed relative to (and thereby moveable with) the rotor piece 202, and is positioned within a magnetic field generated by the magnet 212. When current is run through the coil 210, a corresponding Lorentz force will be generated between the magnet 212 and the coil 210. This Lorentz force (in combinations with any other Lorentz forces generated by other voice coil actuators of the mechanical iris assembly 200) may rotate the rotor piece 202 relative to the stator piece 204.

Because the coil 210 is carried by a moving component (e.g., the rotor piece 202) within the mechanical iris assembly 200, it may be necessary to provide a current pathway from a fixed portion of the mechanical iris assembly 200 in order to power the coil 210. For example, the mechanical iris assembly 200 may comprise a set of springs 214a-214b (depicted schematically by dashed lines) that connect the rotor piece 202 to the stator piece 204. Each spring may include a flexure, sheet spring, or the like, that has sufficient flexibility to accommodate rotation between rotor piece 202 and the stator piece 204. Additionally, each spring may be configured to carry current between the rotor piece 202 and the stator piece 204. For example, a spring may be formed from an electrically conductive material (e.g., an electrically conductive metal) such that current flows through the spring. Additionally or alternatively, the spring may carry one or more electrically conductive traces (not shown) that carry current between the rotor piece 202 and the stator piece 204.

The set of springs 214a-214b may also be electrically connected to the coil 210 in order to drive current through the coil 210. Accordingly, the set of springs 214a-214b may be configured to both i) carry current from the stator piece 204 to the coil 210, and ii) carry current from the coil 210 to the stator piece 204. In this way, current may flow sequentially from the stator piece 204 to the coil 210 via the set of springs 214a-214b, through the coil 210 (e.g., to generate a Lorentz force), and back to the stator piece 204 via the set of springs 214a-214b. In some variations, different springs may carry current to and from the coil 210. For example, in the variation shown in FIG. 2, the set of springs 214a-214b includes a first spring 214a and a second spring 214b. The first spring 214a may be electrically connected to a first end of the coil 210 to carry current from the stator piece 204 to the coil 210. The second spring 214b may be electrically connected to a second end of the coil 210 to carry current from the coil 210 to the stator piece 204.

In other variations, a single spring may be configured to both carry current to and from the coil 210. For example, a spring may be formed from an electrically conductive material and an electrically conductive trace may be deposited on a spring, such that the spring conducts current from the stator piece 204 to the coil 210 and the trace carries current from the coil 210 back to the stator piece 204 (or vice versa). In these instances, the trace may be at least partially coated with a dielectric material (e.g., polyimide) that electrically isolates the trace from the spring. In other variations, first and second electrically conductive traces may be deposited on a spring, such that the first trace carries current from the stator piece 204 to the coil 210 and the second trace carries current from the coil 210 back to the stator piece 204 (or vice versa). The first trace may be electrically isolated from the second trace (e.g., by a dielectric material positioned between the first trace and the second trace).

To route current to and from the set of springs 214a-214b, the stator piece 204 may include a set of electrically conductive traces 216. Each trace of the set of the electrically conductive traces 216 may be deposited on a surface of and/or at least partially embedded in the stator piece 204. Collectively, the set of electrically conductive traces 216 may electrically connect the set of springs 214a-214b to a controller 218, which may allow the controller 218 to drive current through the coil 210. In some variations, some or all of the electrically conductive traces 216 may be formed as part of a flex circuit that is connected to the stator piece 204.

In some variations, the mechanical iris assembly 200 includes a set of ball bearings 220. The mechanical iris assembly 200 may be configured such that the ball bearings 220 are positioned between the rotor piece 202 and the stator piece 204. For example, the rotor piece 202 defines a first set of raceways in which the ball bearings 220 may sit. Similarly, the stator piece 204 may define a second set of raceways in which the ball bearings 220 may also sit. Collectively, the first and second sets of raceways, along with the ball bearings 220 may facilitate rotation of the rotor piece 202 around the stator piece 204 while restricting relative movement between the rotor piece 202 and the stator piece 204 in other directions.

The mechanical iris assembly 200 is configured such that rotation of the rotor piece 202 relative to the stator piece 204 also rotates each of the set of blade elements relative to the stator piece 204. For example, as shown in FIG. 2, the first blade element 206 may be moveably connected to each of the rotor piece 202 and the stator piece 204. For example, the rotor piece 202 may include a first post 222 and the stator piece 204 may include a second post 224. The first blade element 206 may be rotatably coupled to each of the first post 222 and the second post 224, such that rotation of the rotor piece 202 relative to the stator piece 204 causes the first blade element 206 to rotate relative to each of the first post 222 and the second post 224, such as will be described in more detail below. By rotating relative to the second post 224, the first blade element 206 may thereby rotate relative to the stator piece 204. Accordingly, the rotor piece 202 may be rotated to move the set of blade elements and thereby adjust the size and/or shape of an input aperture of a camera module incorporating the mechanical iris assembly 200. Additional details of the mechanical iris assemblies are described herein with respect to FIGS. 3A-4B.

Figure 3A:
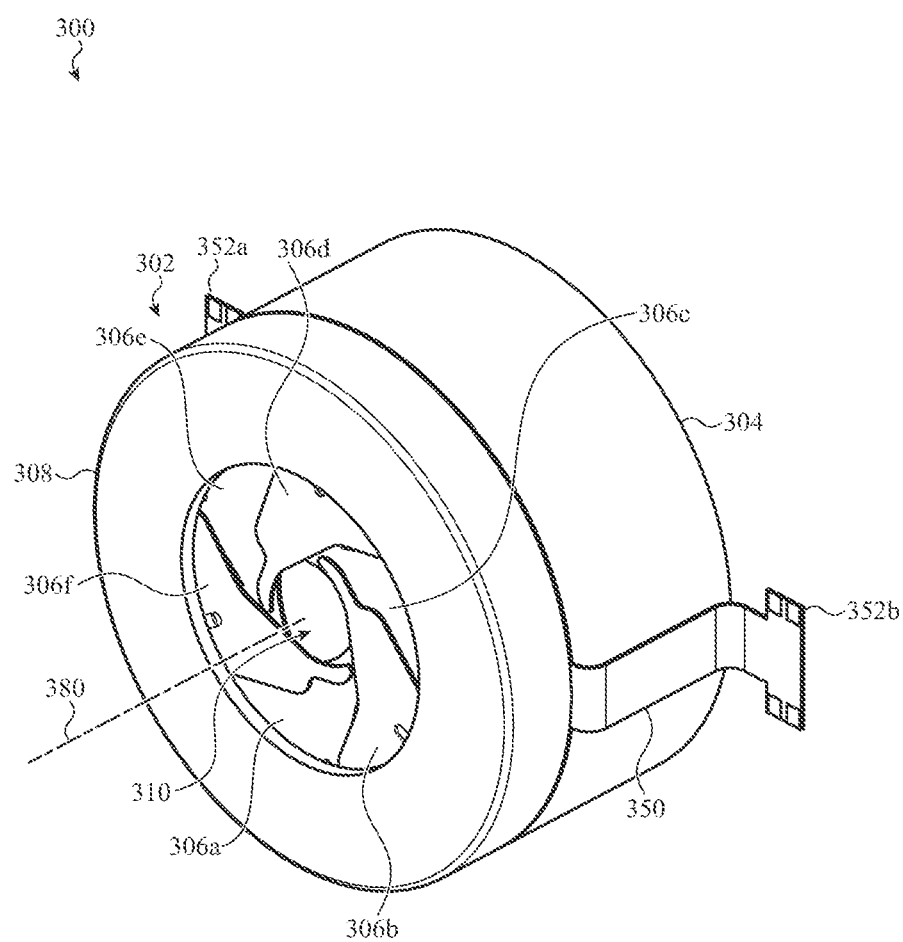
FIGS. 3A and 3B show perspective and exploded perspective views, respectively, of an optical assembly having a mechanical iris assembly as described herein.
Figure 3B:
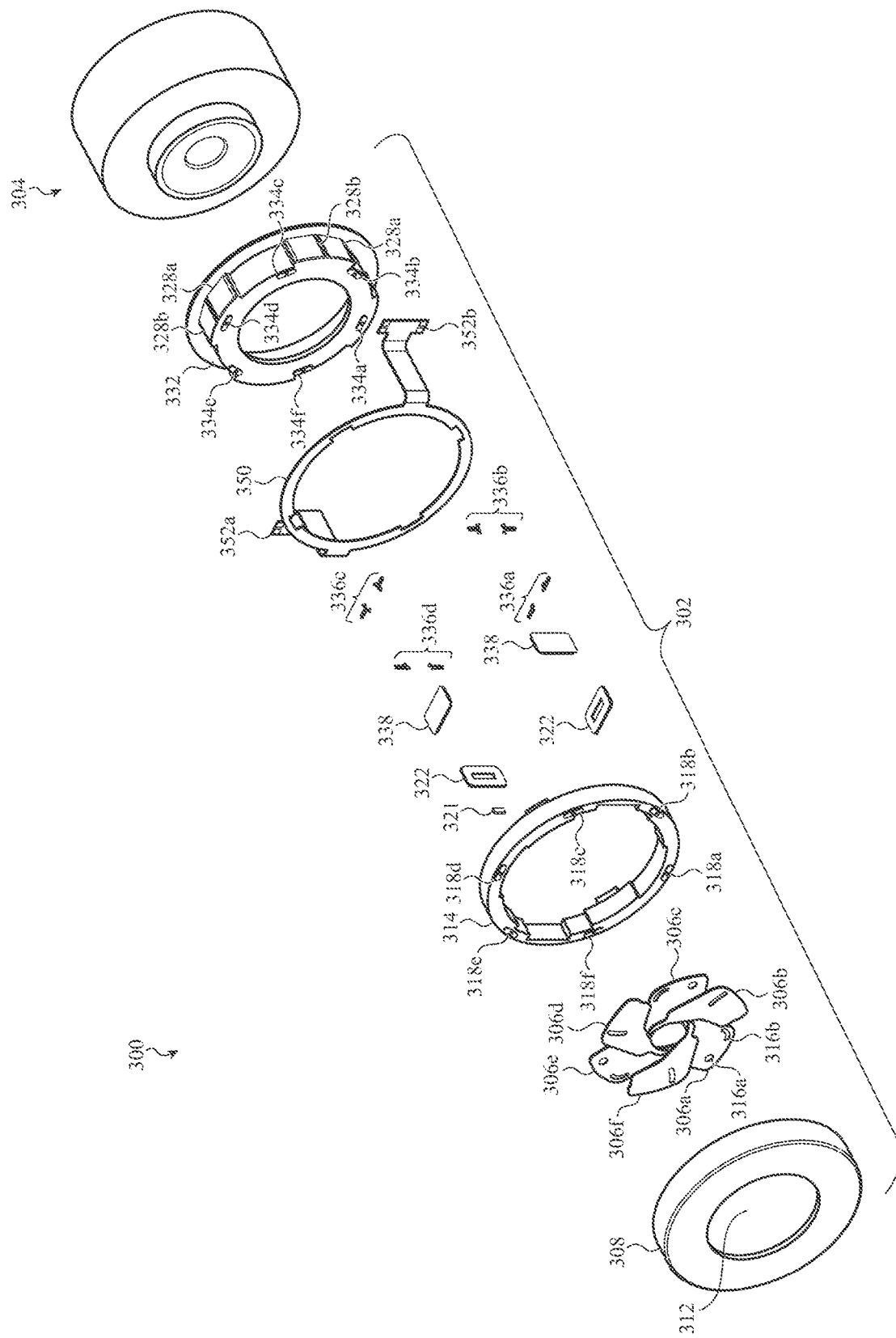
Figure 3C:
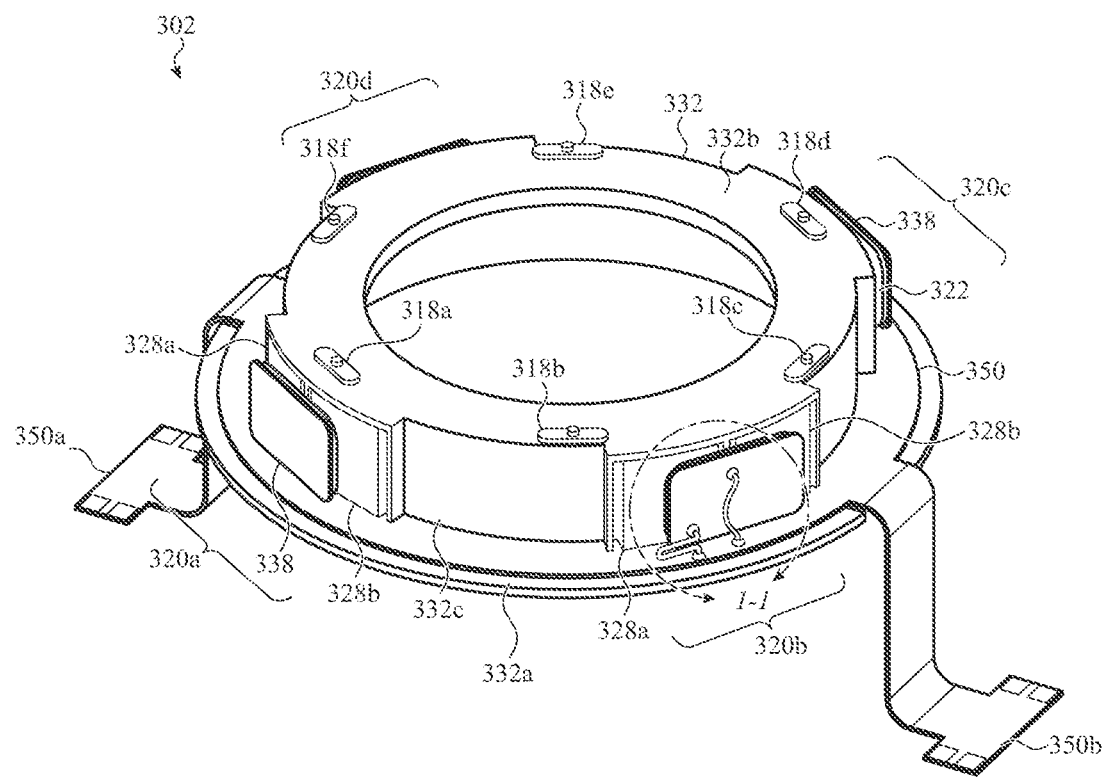
FIG. 3C shows a perspective view of a portion of the mechanical iris assembly of the optical assembly of FIGS. 3A and 3B.
Figure 3C:
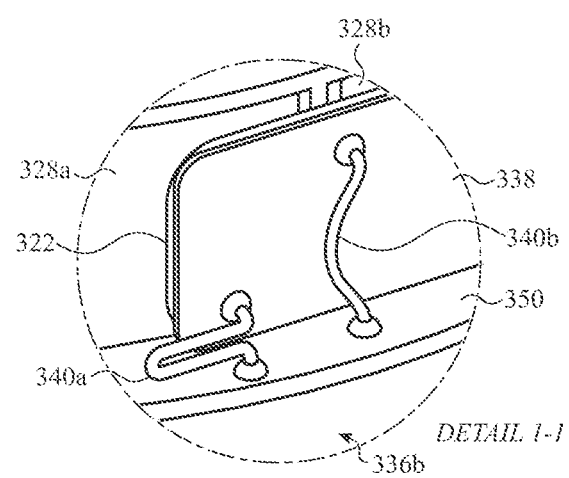

FIGS. 3A and 3B show perspective and exploded perspective views, respectively, of an optical assembly 300 that includes a variation of a mechanical iris assembly 302 as described herein. FIG. 3C shows a perspective view of the mechanical iris assembly 302. The mechanical iris assembly 302 may be positioned at least partially in front of a lens module 304 along an optical axis 380 of the optical assembly 300, such that mechanical iris assembly 302 controls the amount of light received by the lens module 304. The mechanical iris assembly 302 includes a set of blade elements 306a-306f and a front housing piece 308. The set of blade elements 306a-306f and the front housing piece 308 collectively define an input aperture 310 of the mechanical iris assembly 302, and the set of blade elements 306a-306f is moveable relative to the housing 308 to adjust the size and/or shape of the input aperture 310.

Specifically, the front housing piece 308 defines an opening 312 through which light may enter the mechanical iris assembly 302. Depending on the relative positioning of the set of blade elements 306a-306f, the set of blade elements 306a-306f may at least partially block the opening 312 to further limit the light that enters the mechanical iris assembly 302 through the opening 312. The unblocked portion of the opening 312 forms the input aperture 310, which may vary in size and/or shape with movement of the set of blade elements 306a-306f. In some embodiments, it is possible for the set of blade elements 306a-306f to be positioned such that they do not block any portion of the opening 312, in which case the boundary of the opening 312 defines the size and shape of the input aperture 310 (e.g., the input aperture 310 has the same size and shape as the opening 312 defined in the front housing piece 308). Otherwise, the set of blade elements 306a-306f at least partially defines the size and shape of the input aperture 310 by blocking at least a portion of the opening 312.

To move the set of blade elements 306a-306f relative to the front housing piece 308, the mechanical iris assembly 302 further includes a rotor piece 314 and a stator piece 332, where the rotor piece 314 is configured to rotate relative to the stator piece 332. Specifically, the mechanical iris assembly 302 is configured such that rotation of the rotor piece 314 relative to the stator piece 332 also rotates each of the set of blade elements 306a-306f relative to the stator piece 332. The stator piece 332 may have a fixed position relative to the front housing piece 308, such that rotation of the set of blade elements 306a-306f relative to the stator piece 332 also rotates the set of blade elements 306a-306f relative to the front housing piece 308.

In the variation shown in FIGS. 3A and 3B, each of the set of blade elements 306a-306f is moveably connected to both the rotor piece 314 and the stator piece 332. For example, the mechanical iris assembly 302 may utilize a combination of posts and channels that cooperate to movably couple the blade elements to the rotor piece 314 and the stator piece 332. Specifically, a first component (e.g., the rotor piece 314) may define a post that extends at least partially into a channel defined by a second component (e.g., a blade element of the set of blade elements 306a-306f) in a manner that limits relative movement between the two components.

For example, each blade element of the set of blade elements 306a-306f may form a first post-channel pair with the stator piece 332 (or another component with a fixed position relative to the stator piece 332, such as the front housing piece 308) and a second post-channel arrangement with the rotor piece 314 (or another component with a fixed position relative to the rotor piece 314). One of these post-channel pairs creates a pivot point between the blade element and one of the rotor piece 314 or the stator piece 332, while the other post-channel arrangement drives rotation of the blade around the pivot point as the rotor piece 314 rotates relative to the front housing piece 308.

For example, in the variation shown in FIGS. 3A-3C, each blade element of the set of blade elements 306a-306f defines a first channel 316a and a second channel 316b extending at least partially through the blade element (the first channel 316a and second channel 316b are only labeled for blade element 306a, but it should be appreciated that every blade element of the set of blade elements 306a-306f may include corresponding first and second channels). The stator piece 332 defines a first set of posts 334a-334f, each of which extends at least partially into the first channel 316a of a corresponding blade of the set of blade elements 306a-306f. Accordingly, the first channel 316a of a given blade element and the corresponding post of the first set of posts 334a-334f form a first post-channel arrangement (e.g., between the blade element and the stator piece 332).

Similarly, the rotor piece 314 defines a second set of posts 318a-318f, each of which extends at least partially into the second channel 316b of a corresponding blade element of the set of blade elements 306a-306f. For example, post 318a may extend through the second channel 316b of blade element 306a. Accordingly, the second channel 316b of a given blade element and a corresponding post of the second set of posts 318a-318f form a second post-channel arrangement (e.g., between the blade element and the rotor piece 314).

In some variations, one of the post-channel arrangements defines a pivot point for a given blade element, while another post-channel arrangement drives rotation of the blade element around the pivot point as the rotor piece 314 rotates relative to the stator piece 332. In the variation shown in FIGS. 3A-3C, the second post-channel arrangement for each blade element defines a pivot point of the blade element, while the first post-channel arrangement drives rotation of the blade element as the rotor piece 314 rotates relative to the stator piece 332. It should be appreciated that this is just one example, and in other instances the function of these post-channel arrangements may be switched. Similarly, a given blade element may instead include one or more posts in place of the first and/or second channels 316a, 316b, and the post or posts may extend at least partially into a corresponding channel or channels defined in the stator piece 332 and/or the rotor piece 314.

To drive rotation of the rotor piece 314 relative to the stator piece 332, the mechanical iris assembly 302 includes an actuator arrangement comprising at least one voice coil actuator, each of which includes at least one coil and at least one magnet. In the embodiment shown in FIGS. 3A-3C, the actuator arrangement includes a plurality of voice coil actuators 320a-320d. The plurality of voice coil actuators 320a-320d is shown in FIGS. 3A-3C as including four voice coil actuators, though it should be appreciated that actuator arrangement may include more or fewer voice coil actuators as may be desired.

In the variation shown in FIGS. 3A-3C, each of the plurality of voice coil actuators 320a-320d includes a corresponding coil 322, a first magnet 328a, and a second magnet 328b. It should be appreciated that some or all of the plurality of voice coil actuators 320a-320d may have different configurations if so desired (e.g., configurations with multiple coils and/or a single magnet). In variations in which a voice coil actuator includes multiple magnets (e.g., the first magnet 328a and the second magnet 328b) different magnets may be positioned in a side-by-side arrangement and may have opposite polarities. For example, a voice coil actuator may be configured such that the first magnet 328a and the second magnet 328b each have a corresponding magnetization direction that is perpendicular to the optical axis 380. In these instances a north pole of the first magnet 328a may face a corresponding coil 322 of the voice coil actuator and a south pole of the second magnet 328b may face the corresponding coil 322.

Each of the plurality of voice coil actuators 320a-320d may be configured such that the corresponding coil 322 (or coils in variations where a voice coil actuator includes multiple coils) is fixed to the rotor piece 314. In this way, the corresponding coil 322 of each of the plurality of voice coil actuators 320a-320d is moveable with rotor piece 314. Similarly, the corresponding magnets (e.g., the first magnet 328a and the second magnet 328b) of the each of the plurality of voice coil actuators 320a-320d are fixed relative to the stator piece 332. When current is run through a coil of one of the voice coil actuators 320a-320d (e.g., using a controller such as the controller 118 described in relation to FIG. 1C), a corresponding Lorentz force will be generated in a direction perpendicular to an optical axis 380.

In some variations, each of the plurality of voice coil actuators 320a-320d includes a substrate 338 to which the corresponding coil 322 (or coils) of that voice coil actuator is mounted. Each substrate 338 may mechanically support its corresponding coil 322, and may also be configured to route current to and from the corresponding coil 322. Additionally, in some variations the rotor piece 314 may carry a position sensor 321. In some of these variations, the position sensor 321 may be positioned in the magnetic field of one or more magnets of the plurality of voice coil actuators 320a-320d, and may be configured to measured one or more properties (e.g., a magnitude and/or direction) of the magnetic field. As the rotor piece 314 moves relative to the stator piece 332, the position sensor 321 may measure changes to the portion of the magnetic field it experiences, which may be used to derive a relative position between the rotor piece 314 and the stator piece 332. In these variations, signals from the position sensor 321 may be routed to the stator piece 332 via one or more springs, such as described herein. It should be appreciated that other position sensors (such as one or more position sensors mounted on the stator piece 332) may be used in other instances.

To power the various coils 322 of the actuator arrangement, the mechanical iris assembly 200 may include a flex circuit 350 configured to route power and/or control signals to the mechanical iris assembly 302 (e.g., from a controller as described herein). The flex circuit 350 may be connected to the stator piece 332 in any suitable manner that allows the flex circuit 350 to be electrically connected to the coils 322 of the actuator arrangement. In some variations, the flex circuit 350 may include one or more tab portions (e.g., a first tab portion 352a and second tab portion 352b as shown in FIGS. 3A and 3B) that extend externally from the mechanical iris assembly 302. The tab portions may allow for the flex circuit 350 to be electrically connected to a controller, as well as any other portions of the camera module that incorporate the optical assembly 300 and/or an electronic device that incorporates the camera module as may be desired. This may facilitate control of the mechanical iris assembly 302 via a controller as described herein.

To carry current between the stator piece 332 and the coils 322 of the actuator arrangement, the mechanical iris assembly 302 includes a set of springs connecting the stator piece 332 to the rotor piece 314. The set of springs is configured to route current between the stator piece 332 and the rotor piece 314 to power the actuator arrangement. In this way, a controller (e.g., such as the controller 118 described in relation to FIG. 1C) may drive current through the coils 322 of the actuator arrangement via the set of springs.

The mechanical iris assembly 302 may include any number of springs as may be desired to route current to the various coils of the mechanical iris assembly 302. Specifically, each spring may be electrically connected to one or more coils of the actuator arrangement. In some variations, a given spring may be electrically connected to multiple coils, such that the same spring may carry current to and/or from multiple coils. For example, multiple coils of a voice coil actuator and/or the coils of multiple voice actuators may be electrically connected to each other (e.g., in parallel or series), and the same spring or springs may simultaneously route current to and from each of these coils.

In other variations, different springs may be associated with different voice coil actuators. For example, in the variation of the optical assembly 300 shown in FIGS. 3A-3C, the set of springs includes multiple subsets of springs 336a-336d, each of which is associated with a different voice coil actuator of the plurality of voice coil actuators 320a-320d. Specifically, a first voice coil actuator 320a is associated with a first subset of springs 336a that is electrically connected to the corresponding coil 322 of the first voice coil actuator 320a. In this way, a controller may drive current through the corresponding coil 322 of the first voice coil actuator 320a via the first subset of springs 336a. Similarly, a second voice coil actuator 320b is associated with a second subset of springs 336b that is electrically connected to the corresponding coil 322 of the second voice coil actuator 320b, a third voice coil actuator 320c is associated with a third subset of springs 336c that is electrically connected to the corresponding coil 322 of the third voice coil actuator 320c, and a fourth voice coil actuator 320d is associated with a fourth subset of springs 336d that is electrically connected to the corresponding coil 322 of the fourth voice coil actuator 320d. Each subset of springs may include a single spring configured to carry current to and from a corresponding coil, or may include multiple springs electrically connected to the coil.

The springs of the set of springs may connect the stator piece 332 to the rotor piece 314 in any suitable manner. In some variations, one or more springs may be indirectly connected to the stator piece 332 via the flex circuit 350. For example, in the variation of the mechanical iris assembly shown in FIG. 3C, the stator piece 332 includes a base portion 332a, a top portion 332b, and a sidewall 332c extending between the base portion 332a and the top portion 332b. The stator piece 332 and the front housing piece 308 may collectively form an interior volume in which the rotor piece 314 is positioned. In some of these variations, the flex circuit 350 may be at least partially positioned within the interior volume. For example, as shown in FIG. 3C, a portion of the flex circuit 350 may be connected to a top surface of the base portion 332a (e.g., inside of the interior volume), and the first and second tab portions 352a, 352b may extend outside of the interior volume.

In these instances, some or all of the sets of springs may be directly connected to the flex circuit 350. For example, FIG. 3C illustrates the second subset of springs 336b, which in this variation includes a first spring 340a and a second spring 340b. While the first and second springs 340a, 340b are shown in FIG. 3C as having difference shapes, it should be appreciated that in other variations the first and second springs 340a, 340b may have the same shape. As shown in FIG. 3C, a first end of the first spring 340a may be directly connected to the flex circuit 350 (e.g., using a solder bond or the like), which thereby electrically connects the first spring to the flex circuit 350. A first end of the second spring 340b may similarly be directly connected to the flex circuit 350 to electrically connect the second spring 340b to the flex circuit 350.

A second end of the first spring 340a and a second end of the second spring 340b may each be connected to the rotor piece 314, either directly or indirectly, to electrically connect the first and second springs 340a, 340b to the corresponding coil 322 of the second voice coil actuator 320b. For example, in the variation shown in FIG. 3, the second ends of the first and second springs 340a, 340b may each be connected to the substrate 338 of the second voice coil actuator 320b (e.g., using a solder bond or the like). Accordingly, the first spring and second spring 340a, 340b may each be electrically connected to the corresponding coil 322 via the substrate 338. In these instances, current may be driven from the flex circuit 350 to the corresponding coil 322 via the first spring 340a, through the corresponding coil 322, and back to the flex circuit 350 via the second spring 340b.

In these instances, the first and second springs 340a, 340b may be vertically oriented, such that rotation of the rotor piece 314 relative to the stator piece 332 will cause the first and second springs 340a, 340b to deflect in a plane that is parallel to the optical axis 380. The first and second springs 340a, 340b, as well as the remaining subsets of springs 336a, 336c, and 336d, may be configured to sufficiently deflect to accommodate a predetermined amount of rotation between the rotor piece 314 and the stator piece.

Figure 4A:
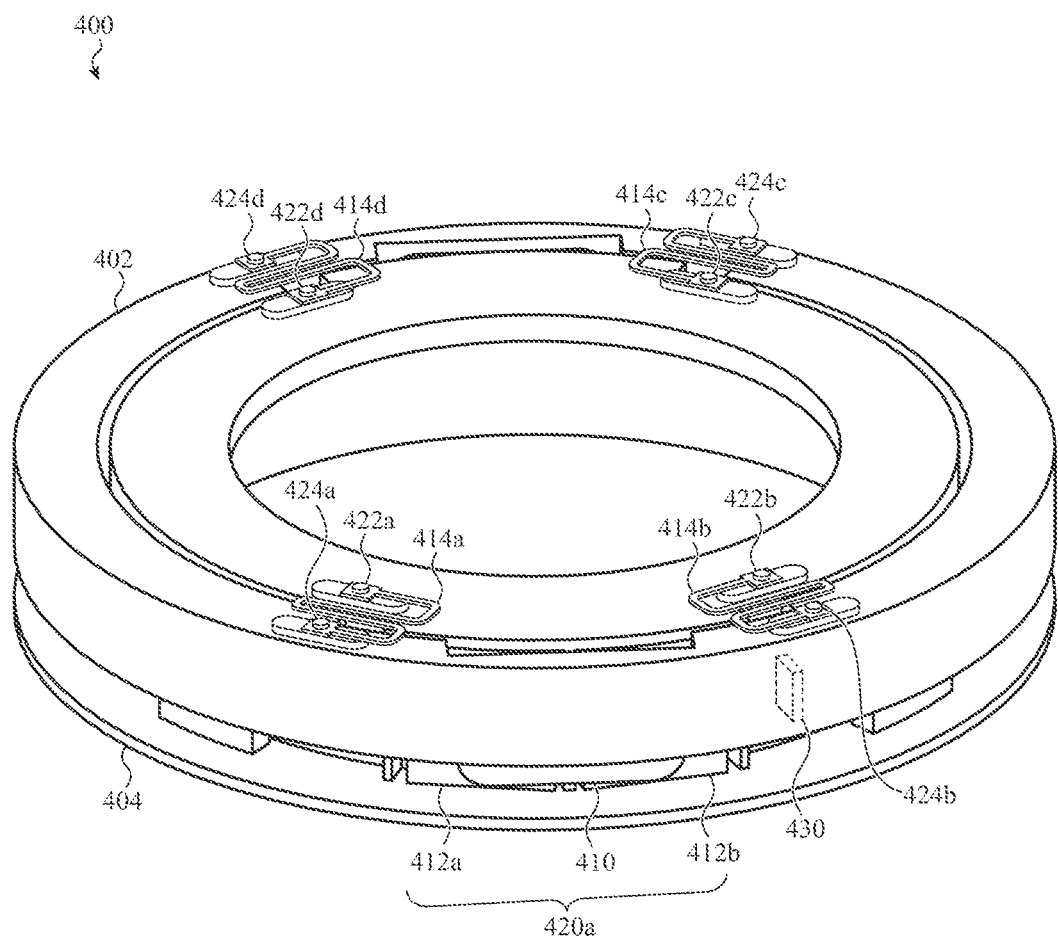
FIGS. 4A and 4B show perspective and top views, respectively, of a variation of a mechanical iris assembly as described herein.
Figure 4B:
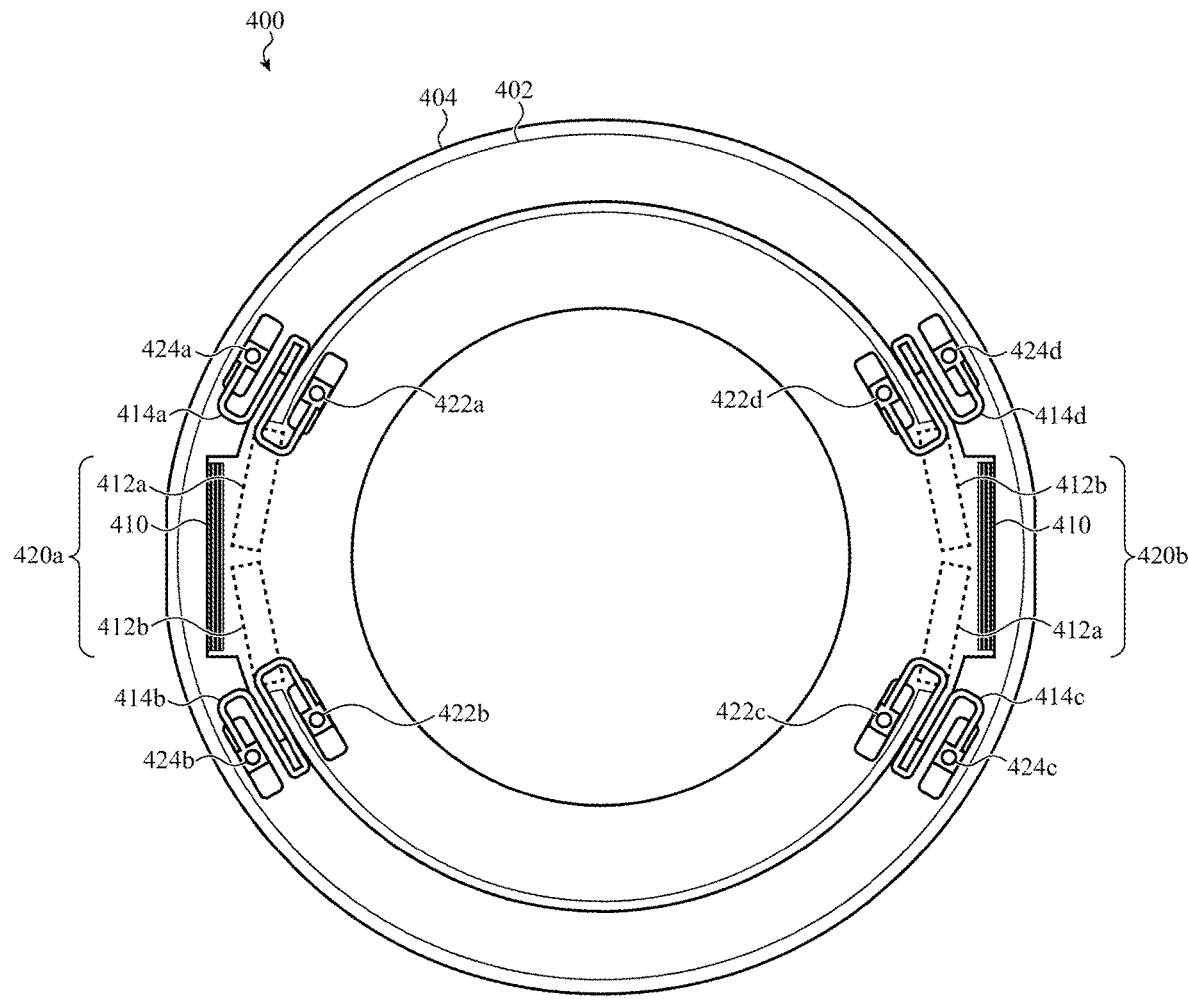

In other variations, one or more of the springs may be horizontally oriented, such that rotation of the rotor piece relative to the stator piece will cause these springs to deflect in a plane that is perpendicular to the optical axis 380. For example, FIGS. 4A and 4B show perspective and top views, respectively, of a portion of a variation of a mechanical iris assembly 400 as described herein. As shown, the mechanical iris assembly 400 may include a rotor piece 402, a stator piece 404, and an actuator assembly that includes a set of voice coil actuators 420a-420b. Each of the voice coil actuators 420a-420b is shown here as including a coil 410 that is fixed with respect to the rotor piece 402 and first and second magnets 412a, 412b that are fixed with respect to the stator piece 404. The mechanical iris assembly 400 may be configured in any manner as described with respect to the mechanical iris assemblies 200 and 302 of FIGS. 2-3C.

In the variation shown in FIGS. 4A and 4B the mechanical iris assembly 400 includes a set of springs 414a-414d connecting the rotor piece 402 to the stator piece 404. In some variations, the set of springs 414a-414d may be connected to the same posts to which the set of blade elements is connected. Specifically, the stator piece 404 may define a first set of posts 422a-422d and the rotor piece 402 may define a second set of posts 424a-424d, such that each spring of the set of springs 414a-414d is connected to a corresponding first post of the first set of posts 422a-422d and a corresponding second post of the second set of posts 424a-424d. For example, a first spring 414a may be connected to post 422a of the first set of posts 422a-422d and to post 424a of the second set of posts 424a-424d. Similarly, a second spring 414b may be connected to post 422b of the first set of posts 422a-422d and to post 424b of the second set of posts 424a-424d, a third spring 414c may be connected to post 422c of the first set of posts 422a-422d and to post 424c of the second set of posts 424a-424d, and a fourth spring 414d may be connected to post 422d of the first set of posts 422a-422d and to post 424d of the second set of posts 424a-424d.

The mechanical iris assembly 400 may include a set of blade elements (not shown), such as the set of blade elements 306a-306f of FIGS. 3A and 3B. Some or all of these blade elements may be moveably connected to a corresponding first post of the first set of posts 422a-422d and a corresponding second post of the second set of posts 424a-424d. For example, a first blade element may be moveably connected to post 422a of the first set of posts 422a-422d and to post 424a of the second set of posts 424a-424d, a second blade element may be moveably connected to post 422b of the first set of posts 422a-422d and to post 424b of the second set of posts 424a-424d, and so on. In this way, the same posts may facilitate both i) carrying current between the rotor piece 402 and the stator piece 404 via a corresponding spring and ii) moving a blade element relative to the stator piece 404. It should be appreciated that the rotor and stator pieces 402, 404 may define additional posts that are moveably connected to one or more blade elements, but are not also connected to a spring of the set of springs 414a-414d.

In some instances, the first set of posts 422a-422d and the second set of posts 424a-424d may electrically connect the set of springs 414a-414d to other components of the mechanical iris assembly 400. For example, each post of the first set of posts 422a-422d may be formed from an electrically conductive material or may include an electrically conductive trace disposed on a surface thereof, such that a first end of each spring of the set of springs 414a-414d is electrically connected to a corresponding post of the first set of posts 422a-422d. The first set of posts 422a-422d may similarly electrically connect the set of springs 414a-414d to a flex circuit (such as flex circuit 350 of FIGS. 3A-3C).

Similarly, each post of the second set of posts 424a-424d may be formed from an electrically conductive material or may include an electrically conductive trace disposed on a surface thereof, such that a second end of each spring of the set of springs 414a-414d is electrically connected to a corresponding post of the second set of posts 424a-424d. The second set of posts 424a-424d may similarly electrically connect the set of springs 414a-414d to a one or more coils carried by the rotor piece 402.

For example, in the variation shown in FIGS. 4A and 4B, the first spring 414a and the second spring 414b are each electrically connected to a coil 410 of the first voice coil actuator 420a. In these instances, current may be driven from a flex circuit (not shown) to the first spring 414a via post 422a, to post 424a via the first spring 414a and to the coil 410 of the first voice coil actuator 420a. After passing through the coil 410, current may pass from the coil 410 to post 424b, to post 422b via the second spring 414b, and back to the flex circuit via post 422b. The third and fourth springs may similarly drive current through the coil 410 of the second voice coil actuator 420b.

When rotation between a rotor piece and a stator piece cause deflection of one or more springs of a mechanical iris assembly, the springs may apply a return force to the rotor piece as the one or more springs attempt to return to an undeflected state. Accordingly, depending on the magnitude of this return force, the mechanical iris assembly may need to supply additional power in order to hold these springs in a deflected position. Accordingly, in some variations the mechanical iris assemblies described herein may include a locking plate. For example, the mechanical iris assembly 400 of FIGS. 4A and 4B includes a locking plate 430 as depicted in FIG. 4A. The locking plate 430 may be formed from a ferritic material (e.g., steel), and may be coupled to the rotor piece 402. When the set of springs 414a-414d are in a undeflected state, the rotor piece 402 may be positioned outside the magnetic fields generated by the magnets of the first and second voice coil actuators 420a, 420b.

As the rotor piece 402 is rotated relative to the stator piece 404 (and each of the set of springs 414a-414d is deflected), the locking plate 430 is moved into the magnetic field of one of the magnets fixed to the stator piece 404 (e.g., a magnetic field of the second magnet 412b of the first voice coil actuator 420a). The locking plate 430 is attracted to the second magnet 412b, and this magnetic force may be sufficient (along with additional magnetic forces applied by other locking plates held by the rotor piece 402) to overcome the return forces applied by the set of springs 414a-414d. This may act to lock the rotor piece 402 in place relative to the stator piece 404, so that the mechanical iris assembly 400 does not need to power the coils 410 to hold the rotor piece 402 in this position. To move the rotor piece 402 away from the locked position, the set of voice coil actuators 420a-420b may supply a rotational force in an opposite direction to disengage the locking plate 430.

In some instances, the mechanical iris assemblies described herein may be configured such that a lens module extends partially through the mechanical iris assembly. For example, in the variation of the optical assembly 300 shown in FIGS. 3A-3C, the stator piece 332 may be shaped to receive a portion of the lens module 304. Specifically, the sidewall 332c of the stator piece 332 may define a cavity that is sized to receive a portion of the lens module 304. For example, the lens module 304 may include a lens barrel and a set of lens elements (which may include a single lens element or a plurality of lens elements depending on the design of the lens module 304). The lens barrel houses and holds the set of lens elements, as well as any other optical elements (e.g., aperture layers, filters, or the like) of the lens module 304. The optical assembly 300 may be configured such that a portion of the lens barrel extends at least partially into the cavity defined by the sidewall 332c of the stator piece 332. In this way, at least a portion of the sidewall may at least partially encircle a portion of the lens barrel. Similarly, the rotor piece 314 may also at least partially encircle a portion of the lens module 304.

In some variation, one or more portions of the stator piece 332 may contact the lens module 304, which may at least partially control the relative positioning between the mechanical iris assembly 302 and the lens module 304. For example, in variations where the stator piece 332 includes a top portion 332b that is elevated relative to a base portion 332a as described above, the optical assembly 300 may be assembled such that the top portion 332b contacts a front surface of the lens module 304 (e.g., via direct contact or indirect contact with an intermediate component such as a spacer positioned between the top portion 332b and the lens module 304). In this way, the top portion 332b of the stator piece 332 may be positioned between the lens module 304 and the set of blade elements 306a-306f. This may limit how far the lens module 304 may be inserted into the mechanical iris assembly 302, and may thereby prevent the lens module 304 from contacting or otherwise interfering with movement of the set of blade elements 306a-306f.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

What is claimed is:

1. A camera comprising:
an optical assembly having an optical axis and comprising:
a lens module; and
a mechanical iris assembly comprising:
a set of blade elements;
a stator piece;
a rotor piece;
a set of springs connecting the rotor piece to the stator piece;
an actuator arrangement comprising a magnet that is fixed relative to the stator piece and a coil that is fixed relative to the rotor piece; and
a controller, wherein:
the coil is positioned in a magnetic field of the magnet and is electrically connected to the set of springs;
the controller is configured to drive current through the coil via the set of springs to rotate the rotor piece relative to the stator piece;
the mechanical iris assembly is configured such that rotation of the rotor piece relative to the stator piece rotates the set of blade elements relative to the stator piece;
the rotor piece defines a first post;
the stator piece defines a second post;
a first blade element of the set of blade elements is moveably connected to the first post and the second post; and
a first spring of the set of springs is electrically connected to the first post and the second post.

2. The camera of claim 1, wherein:
the mechanical iris assembly comprises a flex circuit electrically connected to the set of springs.

3. The camera of claim 1, wherein:
the rotor piece defines a third post;
the stator piece defines a fourth post; and
a second blade element of the set of blade elements is moveably connected to the third post and the fourth post.

4. The camera of claim 3, wherein:
a second spring of the set of springs is electrically connected to the third post and the fourth post.

5. The camera of claim 4, wherein:
the controller is configured to drive the current through the coil via the set of springs such that the current flows to the coil via the first spring and flows from the coil via the second spring.

6. The camera of claim 1, wherein:
the mechanical iris assembly comprises a set of ball bearings positioned between the rotor piece and the stator piece.

7. A camera comprising:
an optical assembly having an optical axis and comprising:
a lens module; and
a mechanical iris assembly comprising:
a set of blade elements;
a rotor piece;
a stator piece comprising a base portion, a top portion, and a sidewall extending between the top portion and the base portion;
a flex circuit that is connected to a top surface of the base portion;
a set of springs electrically connected to the flex circuit and connecting the rotor piece and the stator piece; and
a set of voice coil actuators configured to rotate the rotor piece relative to the stator piece, wherein each voice coil actuator comprises:
at least one magnet connected to the stator piece; and
at least one coil connected to the rotor piece, wherein:
the mechanical iris assembly is configured to route current between the rotor piece and the stator piece via the set of springs to power the set of voice coil actuators;
the mechanical iris assembly is configured such that rotation of the rotor piece relative to the stator piece rotates the set of blade elements relative to the stator piece;
a first spring of the set of springs is mounted directly to the flex circuit.

8. The camera of claim 7, wherein:
the at least one magnet of each of the set of voice coil actuators comprises a first magnet and a second magnet having opposite polarities.

9. The camera of claim 7, wherein the at least one coil of each of the set of voice coil actuators is mounted to a corresponding substrate.

10. The camera of claim 9, wherein:
a first end of the first spring is directly connected to the flex circuit; and
a second end of the first spring is connected to the corresponding substrate of a first voice coil actuator of the set of voice coil actuators.

11. The camera of claim 7, wherein:
a second spring of the set of springs is mounted directly to the flex circuit.

12. A mechanical iris assembly having an optical axis comprising:
a set of blade elements;
a rotor piece;
a stator piece;
a set of springs connecting the rotor piece to the stator piece; and
an actuator arrangement configured to rotate the rotor piece relative to the stator piece, the actuator comprising:

at least one magnet that is fixed relative to the stator piece; and at least one coil that is fixed relative to the rotor piece and positioned in a magnetic field of the at least one magnet, wherein:

the mechanical iris assembly is configured to route current between the rotor piece and the stator piece via the set of springs to power the actuator arrangement;

the mechanical iris assembly is configured such that rotation of the rotor piece relative to the stator piece rotates the set of blade elements relative to the stator piece; and a spring of the set of springs is horizontally oriented such that the rotation of the rotor piece relative to the stator piece causes the spring to deflect in a plane that is perpendicular to the optical axis.

13. The mechanical iris assembly of claim 12, comprising:

a flex circuit electrically connected to the set of springs.

14. The mechanical iris assembly of claim 12, wherein:

the rotor piece defines a first set of posts;

the stator piece defines a second set of posts; and a blade element of the set of blade elements is moveably connected to a first post of the first set of posts and a second post of the second set of posts.

15. The mechanical iris assembly of claim 14, wherein:

a spring of the set of springs is electrically connected to the first post and the second post.

16. The mechanical iris assembly of claim 12, comprising:

a set of ball bearings positioned between the rotor piece and the stator piece.

\* \* \* \* \*